United States Patent
Takano et al.

(10) Patent No.: US 7,221,539 B2
(45) Date of Patent: May 22, 2007

(54) STITCHED SHIELDED POLE STRUCTURE FOR A PERPENDICULAR MAGNETIC RECORDING WRITE HEAD

(75) Inventors: Kenichi Takano, Cupertino, CA (US); Cherng-Chyi Han, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 438 days.

(21) Appl. No.: 10/814,077

(22) Filed: Mar. 31, 2004

(65) Prior Publication Data

US 2005/0219746 A1    Oct. 6, 2005

(51) Int. Cl.
  *G11B 5/31*    (2006.01)
  *G11B 5/23*    (2006.01)
(52) U.S. Cl. .................. 360/126; 360/119
(58) Field of Classification Search ............. 360/125, 360/126, 119
  See application file for complete search history.

(56) References Cited

U.S. PATENT DOCUMENTS

| | | | |
|---|---|---|---|
| 5,075,956 A | 12/1991 | Das | 29/603 |
| 6,128,166 A | 10/2000 | Tanaka et al. | 360/317 |
| 6,278,591 B1 | 8/2001 | Chang et al. | 360/317 |
| 6,591,480 B1 | 7/2003 | Chen et al. | 29/603.14 |
| 2002/0071208 A1 | 6/2002 | Batra et al. | 360/125 |
| 2004/0212923 A1* | 10/2004 | Taguchi | 360/125 |
| 2005/0068671 A1* | 3/2005 | Hsu et al. | 360/125 |
| 2005/0068673 A1* | 3/2005 | Lille | 360/126 |

OTHER PUBLICATIONS

Co-pending U.S. Appl. No. HT-03-014, filed May 19, 2004, U.S. Appl. No. 10/849,312, "A Method for Making a Perpendicular Magnetic Recording Write Head With a Self Aligned Stitched Write Shield", assigned to the same assignee.

* cited by examiner

*Primary Examiner*—Craig A. Renner
(74) *Attorney, Agent, or Firm*—Saile Ackerman LLC; Stephen B. Ackerman

(57) ABSTRACT

A PMR write head has a stitched shield formation which results in a strong perpendicular write field with sharp vertical gradients. The shape of the stitched shield is determined by two design parameters, $d=\frac{1}{2}(W_{SWSLE}-W_{MPTE})$, and $T_{SWS}$, where $W_{SWSLE}$ is the width of the leading edge of the stitched shield in the ABS plane, $W_{MPTE}$ is the width of the trailing edge of the main magnetic pole in the ABS plane and $T_{SWS}$ is the thickness of the stitched shield. By a proper choice of these parameters, the write field of the head is sharply limited in the cross-track direction, so that adjacent track erasures are eliminated.

6 Claims, 5 Drawing Sheets

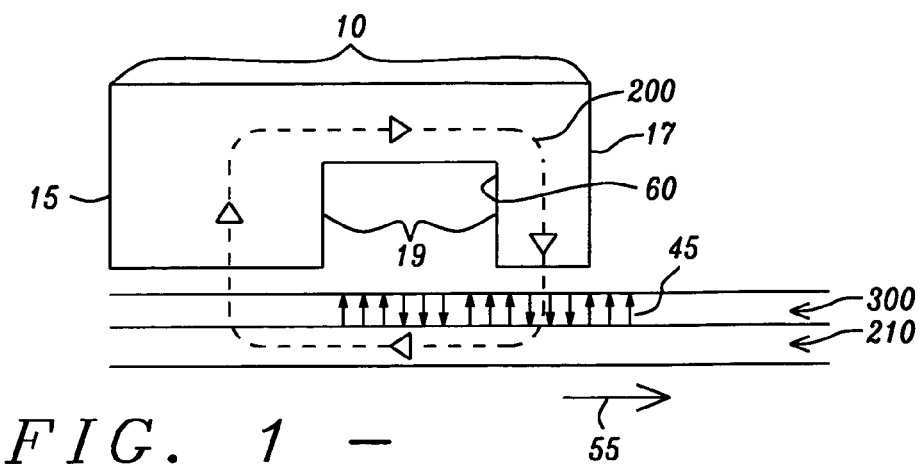
FIG. 1 – Prior Art
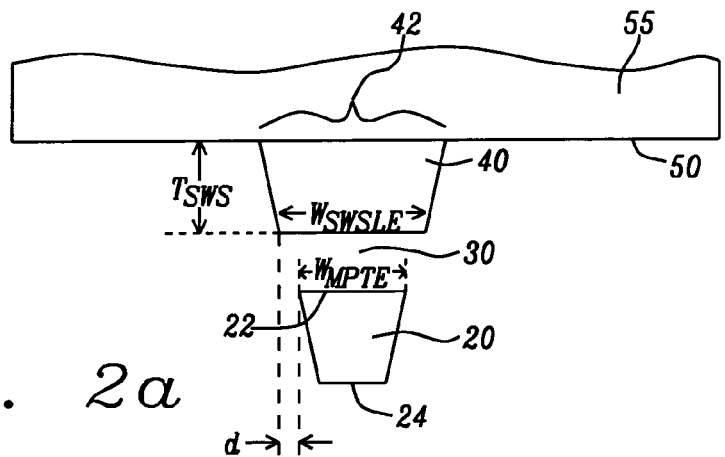
FIG. 2a
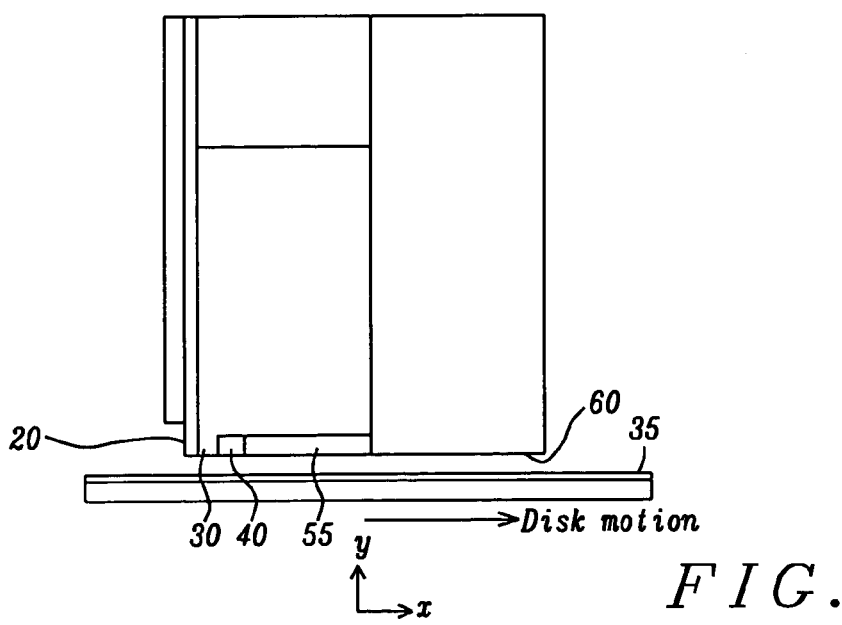
FIG. 2b (a) Perpendicular head field profile (b) Longitudinal head field profile

STITCHED SHIELDED POLE STRUCTURE FOR A PERPENDICULAR MAGNETIC RECORDING WRITE HEAD

RELATED APPLICATION

This application is related to Ser. No. 10/849,312, Filing date May 19, 2004, assigned to the same assignee as the present Application.

BACKGROUND OF THE INVENTION

1. Field of the Invention

This invention relates generally to the design of magnetic recording heads for high recording density, particularly heads designed for perpendicular magnetic recording.

2. Description of the Related Art

The commonly used inductive magnetic write head technology utilizes the longitudinal configuration. In this configuration a magnetic field fringes across a write gap between an upper and a lower pole in the plane of the air bearing surface (ABS) of the write head. This plane will be referred to as the longitudinal plane. The ABS is positioned above and parallel to the surface of a recording medium, such as a hard disk. The surface of the hard disk is formed of a magnetic medium. As the hard disk moves beneath the ABS, a horizontal component of the fringing field of the write head interacts with and aligns regions of sharp magnetic transitions (essentially magnetic domains) which are horizontally disposed within the surface of the magnetic medium.

Perpendicular magnetic recording (PMR) offers a new writing configuration that is a viable replacement candidate for the horizontal configuration as recording area densities approach 500 Gb/in$^2$. At this ultra-high area density, the super-paramagnetic limit of magnetic media becomes a problem, which is the condition wherein magnetic domains are so small that they lack thermal stability and can be randomly aligned by thermal agitation.

As is well explained by Tanaka et al. (U.S. Pat. No. 6,128,166) and also by Batra et al. (U.S. Patent Application Publication No.: US 2002/0071208 A1), in perpendicular recording, the magnetic recording medium is formed in two layers, an upper layer formed vertically over a lower layer. The lower layer is formed of soft magnetic material. An upper layer has a high coercivity (it is a hard magnetic material) and a vertical magnetic anisotropy, ie an anisotropy that is perpendicular to the surface plane of the recording medium. The soft magnetic lower layer acts to concentrate the field produced by the write head. This configuration has the potential to support much higher recording densities due to a reduced demagnetization field required to induce sharp magnetic transitions during the recording process. The fringing field across the write gap of the write head then interacts with the vertical anisotropy of the upper layer with a perpendicular field component and its gradient, rather than a horizontal component, and produces sharp transitions therein. The vertical transitions in the perpendicular recording medium are more stable thermally due, in part, to a thicker upper layer, so the super-paramagnetic limits is no longer as significant a problem it is in longitudinally anisotropic media.

The design of a perpendicular magnetic recording (PMR) head offers new challenges, since it must provide a writing field of extremely high definition and sharp field gradient, compatible with the increased area density of the medium and its correspondingly narrower track widths. Batra et al. (cited above) shows the basic design and operation of a perpendicular write head of the prior art, which is shown also in our FIG. 1. Referring to FIG. 1, there is shown schematically a side cross-sectional view of a particularly simplified write head (10), its magnetic field (200) and a magnetic medium moving beneath it. The magnetic medium has two layers, a lower soft layer (210) and an upper hard layer (300) with vertically oriented magnetic domains (arrows (45)). The medium is moving from right to left, as shown by the arrow (55). The pole structure of the write head includes a return (lower) pole (15) and a main writing (upper) pole (17) with a gap (19) between them. An induction coil (60) is wound around the pole to produce the magnetic field (shown by closed field lines (200). The field emerges from the main pole and returns through the lower pole. Batra et al. note that the write head illustrated will create problems of unwanted side writing because of the lack of a shielding mechanism to contain the field laterally and prevent the field from spreading beyond the track being written upon. Batra, therefore, teaches a write head in which there are two return poles and a central write pole formed between them, wherein side shields are formed on either side of the poles.

More traditional longitudinal write heads have also had to deal with problems associated with narrow tracks, such as unwanted side writing (writing on tracks adjacent to the actual track being written on). One approach is taught by Chang et al. (U.S. Pat. No. 6,278,591 B1), which is to form the pole with an inverted head. Das (U.S. Pat. No. 5,075,956) teaches a write head in which the pole tip is surrounded on either side by shields that contain unwanted flux spreading. Another approach to producing such write heads with narrow pole tips and correspondingly highly defined write gaps has been the stitched pole write head. This design permits the pole tip to be formed separately, whereby its shape and dimensions can be carefully controlled, then "stitched" or plated onto a larger pole piece. Chen et al. (U.S. Pat. No. 6,591,480 B1) teaches a process for forming a stitched longitudinal write head with a narrow pole tip in which the magnetic flux across the write gap is concentrated by a dielectric-filled gap in the lower pole piece.

The purpose of the present invention is to provide a novel shield formation for a PMR head that effectively eliminates adjacent track erasure (ATE) by concentrating the writing field at the position of the track being written upon and effectively shielding the writing field from leakage into regions laterally displaced from the track being written upon. More specifically, we propose a write shield in which a small additional shield is stitched onto a main write shield, between the main write shield and the write gap of the head. Not only does this shield serve to prevent ATE, but it improves the vertical field gradient for more efficient writing.

SUMMARY OF THE INVENTION

A first object of this invention is to provide a write shield formation for a perpendicular magnetic recording (PMR) head that significantly reduces unwanted side writing and adjacent track erasure (ATE) as compared to conventional designs.

A second object of the present invention is to provide a write shield formation for a PMR head that produces reduced lateral flux leakage.

A third object of the present invention is to provide a write shield formation for a PMR head that produces an improved perpendicular writing field component and improved perpendicular writing field gradient.

These objects will be achieved by a PMR head with a stitched write shield design comprising a main pole piece, a write gap formed on an upper surface of the main pole piece, and a novel shield formation above the write gap. The shield formation comprises a main write shield and an additional smaller shield that is stitched onto the main shield, between that main shield and the write gap, so that a lower surface of the stitched shield contacts the upper surface of the write gap and an upper surface of the stitched shield contacts (and is formed on) a lower surface of the main shield.

The efficacy of the invention depends on design parameters, d and $T_{SWS}$ where d is one-half the difference between the width of the lower edge of the stitched write shield and the width of upper edge of the pole and $T_{SWS}$ is the distance between the upper and lower edges of the stitched write head. By a proper choice of the design parameters, the stitched write shield significantly reduces adjacent track erasures (ATE) and helps produce a perpendicular magnetic field with a sharp gradient.

In the description of the preferred embodiment, it will be shown how values of d and $T_{SWS}$ can be chosen to meet the objects of the invention.

BRIEF DESCRIPTION OF THE DRAWINGS

FIG. 1 is a schematic drawing of a PMR head, showing how it interacts with a recording medium.

FIGS. 2a–b shows, schematically, an ABS plane drawing (2a) of the stitched write shield of the present invention and a side view (2b).

DESCRIPTION OF THE PREFERRED EMBODIMENTS

Figure 3A:
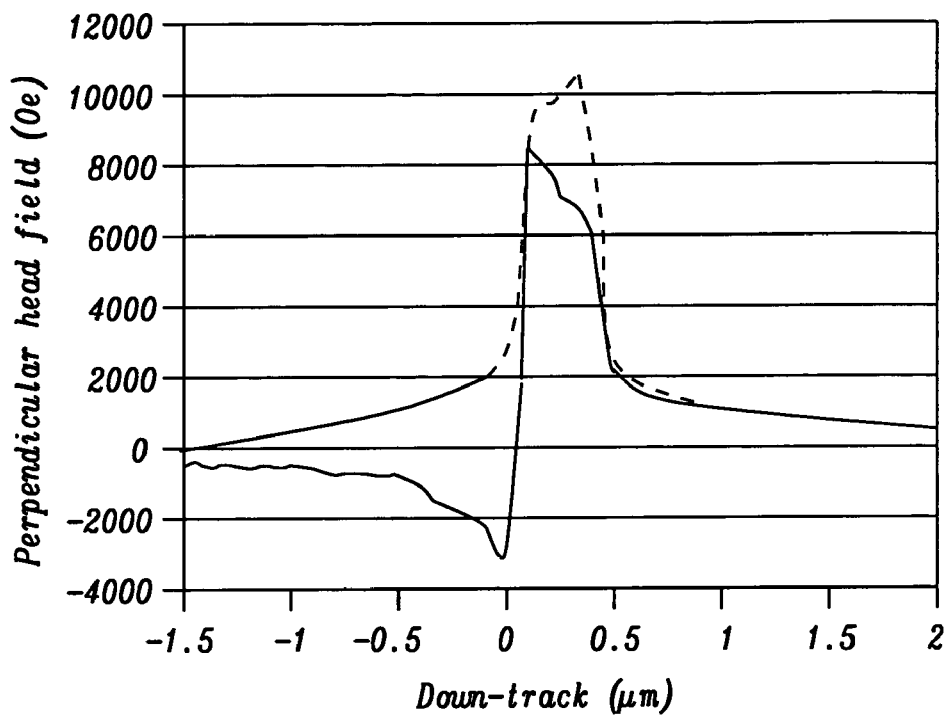
FIGS. 3a–b are graphical representations of the perpendicular and longitudinal magnetic fields produced by an unshielded and a shielded pole.

The preferred embodiment of the present invention is a PMR head that includes a write shield formation having a stitched portion formed on a leading edge of a main portion, the stitched portion being separated from a main magnetic pole by a narrow write gap layer.

Referring to FIG. 2a, there is shown schematically a front view of the air bearing surface plane (ABS) of a preferred embodiment of the present invention. A magnetic recording medium, typically a disk, which would be in front of the figure plane, moves past this surface from bottom to top (the −x direction) as shown by the arrow. In the description that follows, edges of the pole or shields past which a given region of the medium first moves are denoted "leading" edges and edges past which that region of the medium moves last are called "trailing" edges.

The main pole (20) has, in the ABS cross-sectional plane, a truncated wedge shape of narrow dimension with a leading edge (24) and a trailing edge (22). The trailing edge of the pole has a width, $W_{MPTE}$ in the ABS plane, which is between approximately 0.1 and 0.2 microns. The write gap layer (30) is formed above the main pole, contacting its trailing edge surface. The write gap layer is a layer of dielectric material, such as alumina, and its thickness is between approximately 0.04 and 0.16 microns. The stitched write shield (40), which is symmetrically positioned above the magnetic pole, also has a truncated wedge shape with slight taper. The stitched write shield is formed above the write gap layer (30) and its trailing edge (42) is stitched onto the leading edge (50) of the main write shield (55). The stitched write shield also has a leading edge (44) with a leading edge width, $W_{SWSLE}$ which is between approximately 0.1 and 0.22 microns in the ABS plane. The stitched write shield also has a thickness, TSWS, which is the vertical distance between its leading and trailing edges. Values of the thickness to satisfy the objects of the invention will be determined experimentally below.

Referring to FIG. 2b, there is shown a side view of the PMR head shown in ABS view in FIG. 2a. The ABS plane (shown as a line) (60) is slightly raised above the moving disk surface (35) whose direction of motion is indicated with an arrow. The pole (20), the write gap (30), the stitched shield (40) and the main shield (55) are also shown in side view. Other portions of the device are also shown, but are not a part of the invention.

A critical design parameter for the invention is the quantity d, shown in FIG. 2a as the space between two vertical fiducial lines, which is one-half the difference between the width of the leading edge of the stitched shield and the width of the trailing edge of the pole, $d=½ (W_{SWSLE}−W_{MPTE})$. It is noted that in the preferred embodiment disclosed below, the main shield, the stitched shield and the write pole of the PMR are all formed of ferromagnetic materials including Co, Fe, CoNiFe, FeCo, their composites, their oxygen or nitrogen doped composites, their amorphous forms and their multi-layered laminates into which may be inserted non magnetic layers.

Figure 3B:
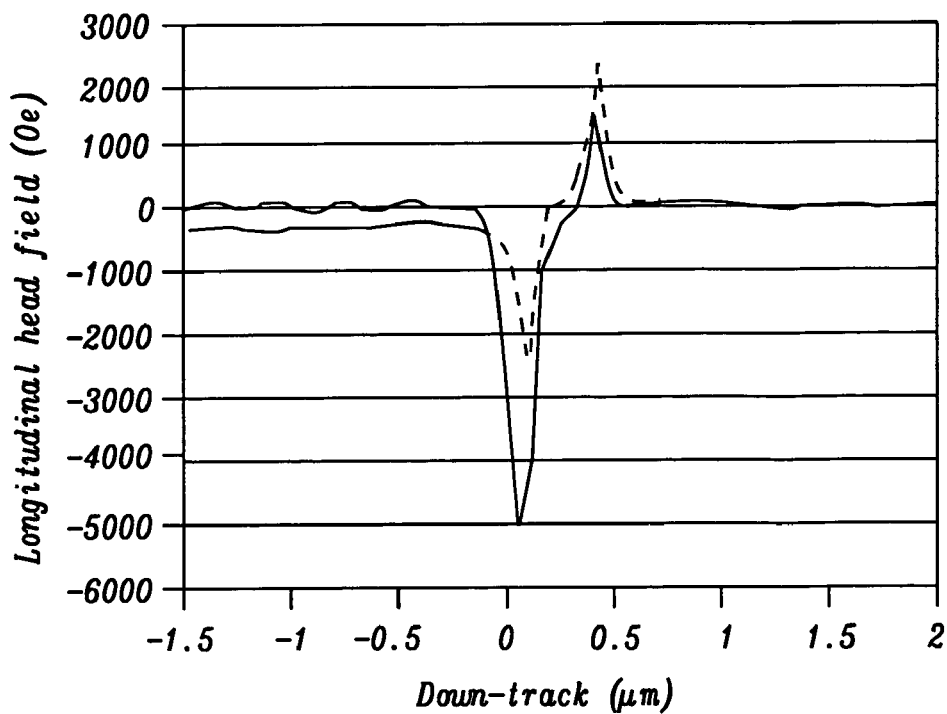

The efficacy of the configuration shown in FIGS. 2a and 2b can be inferred from measurements taken of the writing field produced by the configuration along the direction of the track being written upon. FIG. 3a show a graphical representation of the perpendicular component (y-component) of the writing field, $H_y$, as a function of distance, in microns, along the track (x-direction), for an unshielded single pole (broken line) and a shielded pole (solid line). The pole is between approximately 0.1 and 0.4 microns, the shield (in the shielded case) is between approximately −2.3 and 0 microns. In FIG. 3b the longitudinal component of the writing field, $H_x$, of the unshielded and shielded pole are shown.

Figure 4A:
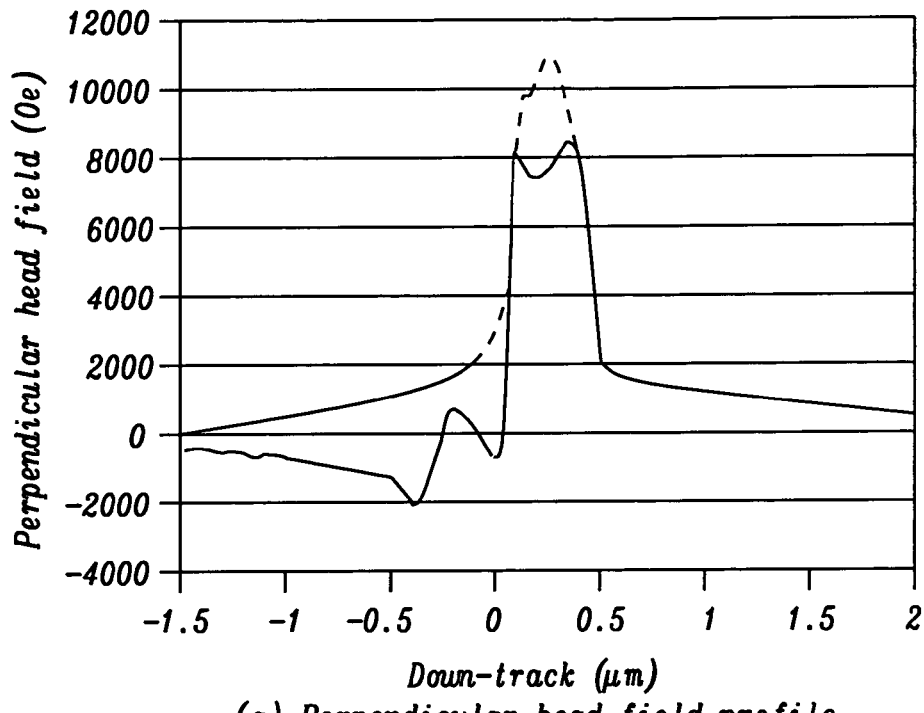
FIGS. 4a–b are graphical representations of the perpendicular and longitudinal magnetic fields produced by an un shielded pole and by the stitched shielded pole of the present invention.
Figure 4B:
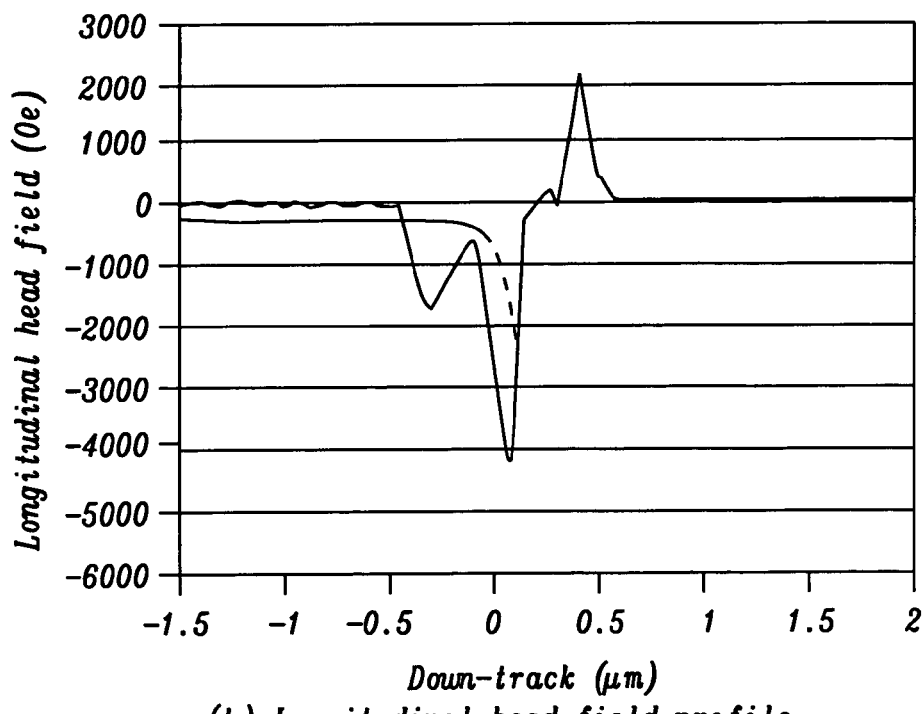

FIGS. 4a and 4b show analogous graphical comparisons of perpendicular (4a) and longitudinal (4b) fields of an unshielded (dashed lines) and a stitched-shielded head (solid lines) of the present invention. As in the previous FIG. 3a-b, the location of the unshielded pole is between approximately 0.1 and 0.4 microns, and the locations of the main pole, stitched shield and main shield are, respectively, between approximately 0.1 and 0.4, between approximately −0.3 and 0 and between approximately −2.3 and −0.3 microns.

As can be seen from the shape of the graphs, the perpendicular field of the stitched pole produces larger perpendicular field gradients ($dH_y/dx$) at the trailing edge of the main pole (0.1 microns down the track) than does the single pole head.

Figure 5:
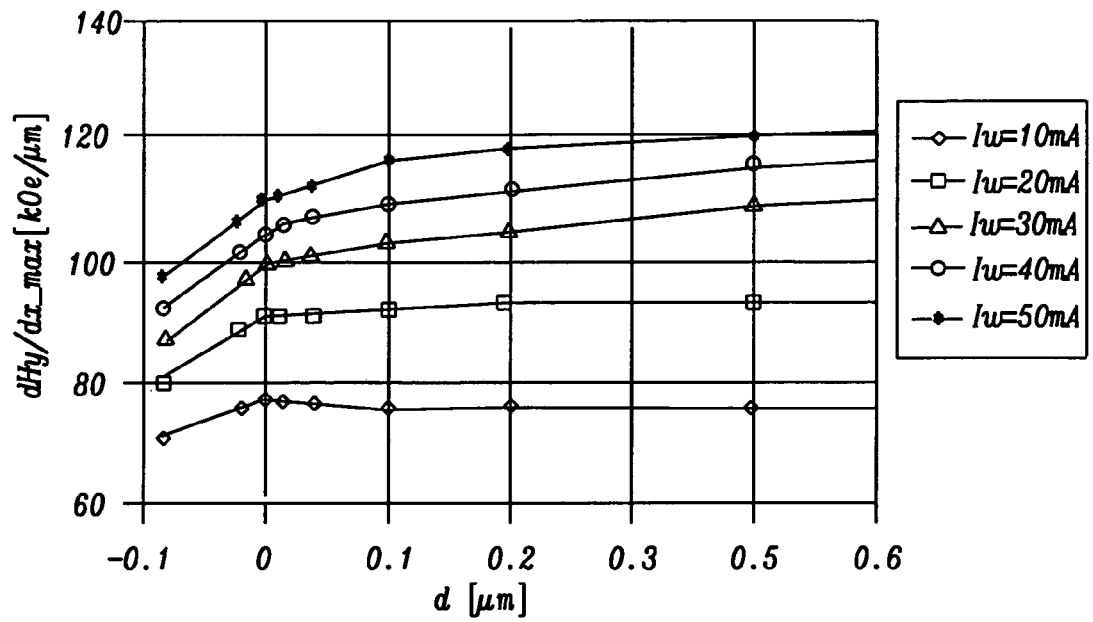
FIG. 5 is a graphical representation of the perpendicular field gradient of the present invention (a magnetic pole shielded by a stitched write shield) as a function of the variation of a critical design parameter.

Referring to FIG. 5, there is shown a sequence of 5 curves, each of which represents the relationship between maximum $dH_y/dx$ (gradient of the perpendicular field component with respect to distance along a track) and d (in microns). The 5 curves represent 5 different values of write current, $I_W$, ranging from 10 mA to 50 mA. A legend at the side of the graph identifies the curves and their currents. The gradient has poor values when d is negative, which occurs if the width of the stitched shield is less than the width of the pole. From this we conclude that the shield width must be greater than the pole width to achieve desirable field gradients.

Figure 6:
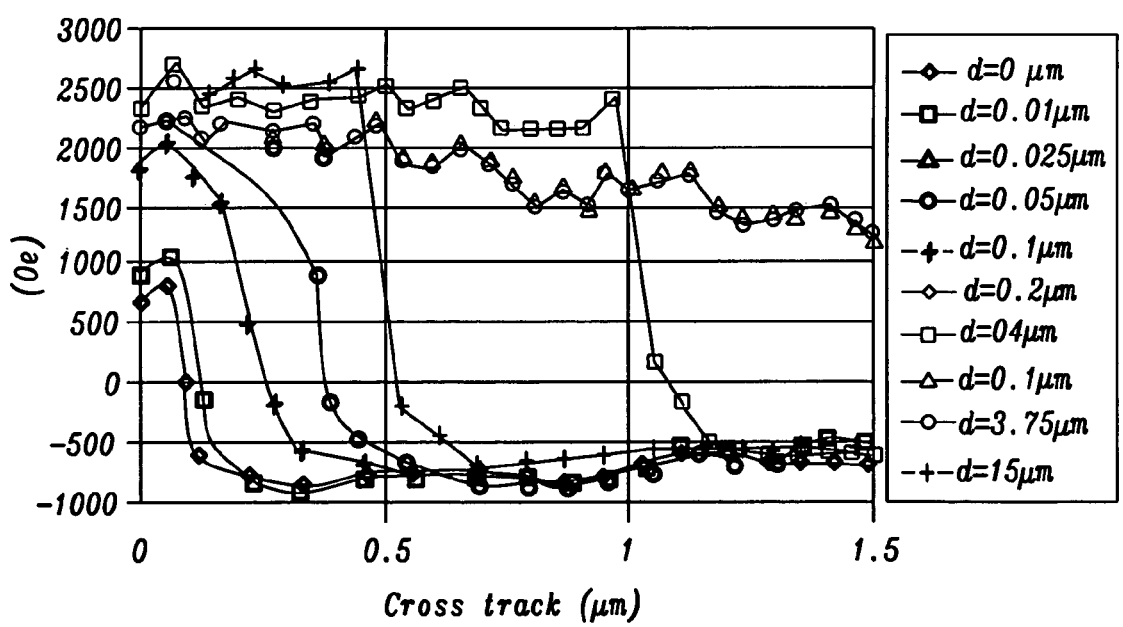
FIG. 6 is a graphical representation of the magnetic field profile of the present invention (a magnetic pole shielded by a stitched write shield) at the stitched-shield edge as a function of cross-track distance (the z-direction).

Referring to FIG. 6, there is shown 10 curves representing the profile of the perpendicular field component at the leading edge of the stitched shield as a function of z (the direction across the recording track), for 10 different values of d. The value 0 on the abscissa is the center of the track. The peak value of $H_y$ increases steadily as d goes from 0 to 0.2 microns, then the increase tapers off. As d increases above 0.2 microns, the value of $H_y$ remains high along the entire edge of the shield. Thus, to maximize the field at the center of the write gap and minimize it in the z-direction, a small d value is preferable, such as d equal to or less than 0.1 micron.

Figure 7:
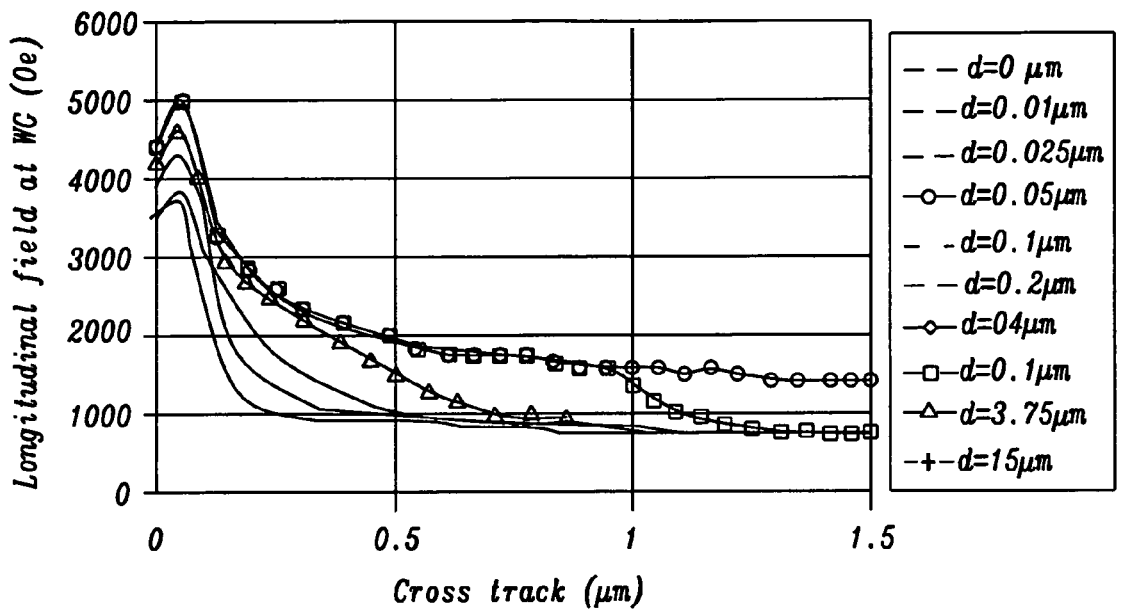
FIG. 7 is a graphical representation of the longitudinal field profile at the write gap of the present invention (a magnetic pole shielded by a stitched write shield) as a function of cross-track distance (the z-direction).

Referring next to FIG. 7 there is shown a set of curves corresponding to those in FIG. 6, except it is the horizontal field component, $H_x$, that is plotted across the write gap as a function of z. The peak value increases up to d=1.0 microns. In addition, the value of the horizontal component remains large for d>0.1 microns. Thus, to suppress leakage of the horizontal component, the value of d should be less than or equal to 0.1 microns.

To summarize how d should be chosen:
a) For optimum head field gradient, d should be equal to or larger than 0 microns.
b) For minimum perpendicular field component at the stitched shield edge, d should be equal to or smaller than 0.1 microns.
c) For restriction of the longitudinal field at the write gap, d should be equal to or less than 0.1 microns.

We conclude that d should be between approximately 0 and 0.1 microns.

Figure 8:
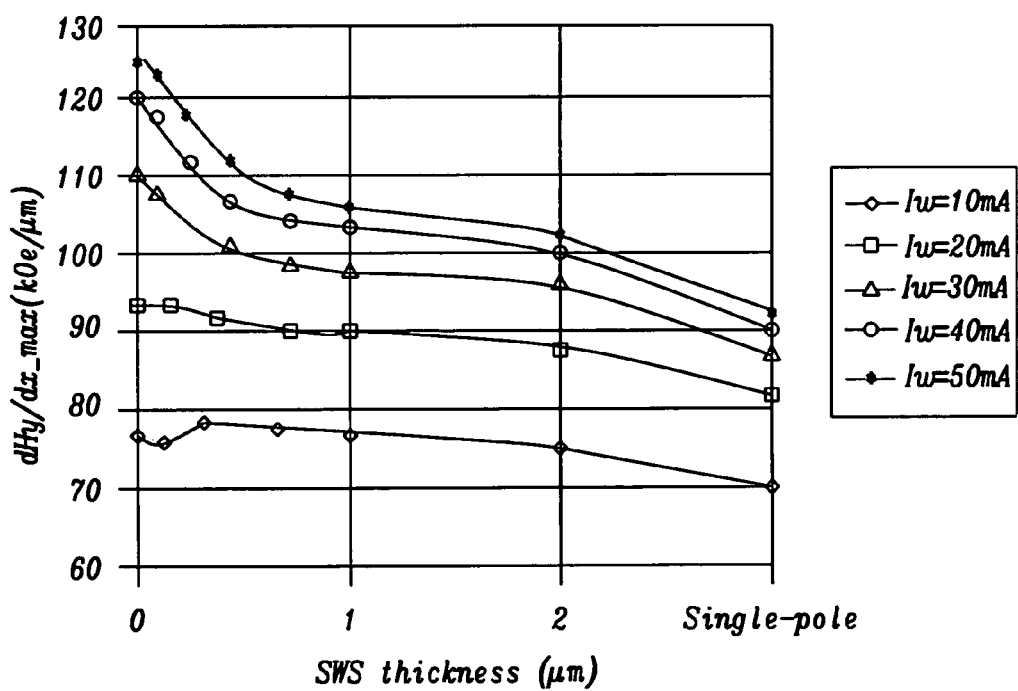
FIG. 8 is a graphical representation of perpendicular field gradient as a function of $T_{SWS}$.

Referring next to FIG. 8, there is shown 5 graphs of perpendicular field gradient at the trailing edge of the magnetic pole as a function of stitched-shield thickness. The graphs correspond to values of the write current between 10 mA and 50 mA. Although any stitched shield thickness can improve the value of the field relative to an unshielded pole, a lesser thickness shows an increase in the field gradient, particularly if the thickness is less than 1 micron and the current is larger than 10 mA. Because the stitched shield saturates easily at its interface with the main write shield, it is easier to work with a thin stitched shield than a thick one. Consequently, a preferable stitched shield thickness is $T_{SWS}$ between approximately 0 and 1 microns.

As is understood by a person skilled in the art, the preferred embodiments of the present invention are illustrative of the present invention rather than limiting of the present invention. Revisions and modifications may be made to methods, materials, structures and dimensions employed in designing and forming a stitched write shield for a PMR head, while still designing and forming such a stitched write shield for a PMR head in accord with the spirit and scope of the present invention as defined by the appended claims.

What is claimed is:

1. A shielded PMR head comprising:
   a PMR head having a magnetic pole;
   a main write shield formed symmetrically above said magnetic pole, said main write shield having a leading edge and said pole having a trailing edge with a trailing edge width, $W_{MPTE}$, in an ABS plane;
   a stitched write shield formed symmetrically on a leading edge of said main write shield and symmetrically above said magnetic pole, a trailing edge of said stitched write shield contacting said leading edge of said main write shield and said stitched write shield having a thickness, $T_{SWS}$, and said stitched write shield having a leading edge with a leading edge width, $W_{SWSLE}$, in said ABS plane and wherein the cross-sectional shapes of said stitched write shield and said magnetic pole in said ABS plane are truncated wedges with $W_{SWSLE}$ greater than $W_{MPTE}$;
   a write gap layer formed between said leading edge of said stitched write shield and said trailing edge of said magnetic pole.

2. The shielded PMR head of claim 1 wherein a design parameter, d, which is $\frac{1}{2}(W_{SWSLE}-W_{MPTE})$, is between approximately 0 and 0.1 microns.

3. The shielded PMR head of claim 1 wherein $T_{SWS}$ is between approximately 0 and 1.0 microns.

4. The shielded PMR head of claim 1 wherein said stitched shield is formed of Fe, Co, CoNiFe, FeCo, NiFe, their composites, their oxygen or nitrogen doped composites, their amorphous forms or their multi-layered laminates, which laminates may include the insertion of non-magnetic layers.

5. The shielded PMR head of claim 1 wherein $T_{SWS}$ is between approximately 0 and 1.0 microns, $W_{SWSLE}$ is between approximately 0.1 and 0.22 microns and $W_{MPTE}$ is between approximately 0.1 and 0.2 microns.

6. The shielded PMR head of claim 5 wherein the write gap layer is formed of alumina, to a thickness between approximately 0.04 and 0.16 microns and a width between $W_{SWSLE}$ and $W_{MPTE}$.

* * * * *